United States Patent
Betin et al.

(10) Patent No.: US 7,889,767 B2
(45) Date of Patent: Feb. 15, 2011

(54) SELF-COHERENT COMBINING TECHNIQUE FOR HIGH POWER LASER IMPLEMENTATION AND METHOD

(75) Inventors: Alexander A. Betin, Manhattan Beach, CA (US); Kalin Spariosu, Thousand Oaks, CA (US)

(73) Assignee: Raytheon Company, Waltham, MA (US)

(*) Notice: Subject to any disclaimer, the term of this patent is extended or adjusted under 35 U.S.C. 154(b) by 853 days.

(21) Appl. No.: 10/964,383

(22) Filed: Oct. 13, 2004

(65) Prior Publication Data

US 2006/0078033 A1   Apr. 13, 2006

(51) Int. Cl.
*H01S 3/30*   (2006.01)

(52) U.S. Cl. .............. 372/6; 372/27; 372/37; 372/64

(58) Field of Classification Search .......... 372/6, 372/27, 37
See application file for complete search history.

(56) References Cited

U.S. PATENT DOCUMENTS

| | | | | |
|---|---|---|---|---|
| 5,591,965 A * | 1/1997 | Udd | ............ | 250/227.18 |
| 5,677,920 A * | 10/1997 | Waarts et al. | ............ | 372/6 |
| 6,049,415 A * | 4/2000 | Grubb et al. | ............ | 359/341.1 |
| 6,124,960 A * | 9/2000 | Garthe et al. | ............ | 398/194 |
| 6,298,187 B1 * | 10/2001 | Waarts et al. | ............ | 385/37 |
| 6,317,443 B1 * | 11/2001 | Craig et al. | ............ | 372/38.04 |
| 6,463,083 B1 * | 10/2002 | Sumiyoshi et al. | ............ | 372/6 |
| 7,054,339 B1 * | 5/2006 | Hu et al. | ............ | 372/12 |
| 2003/0231315 A1 * | 12/2003 | Arbore et al. | ............ | 356/477 |
| 2004/0165620 A1 * | 8/2004 | Rogers et al. | ............ | 372/6 |
| 2005/0169323 A1 * | 8/2005 | Spariosu et al. | ............ | 372/9 |
| 2006/0145920 A1 * | 7/2006 | Stephens | ............ | 342/368 |

FOREIGN PATENT DOCUMENTS

| | | |
|---|---|---|
| JP | 2004031434 | 1/2004 |
| WO | WO 2004/068652 | 8/2004 |

OTHER PUBLICATIONS

Southampton Photonics press release, Aug. 27, 2003.
Sabourdy, D. et al: "Efficient Coherent Combining of Widely Tunable Fiber Lasers", Optics Express, Optical Society of America, Wash., D.C., US, vol. 11, No. 2, Jan. 27, 2003, pp. 87-97, XP002293249, ISSN: 1094-4087, *Abstract*, *Figs. 1, 11*.

(Continued)

*Primary Examiner*—Dung T Nguyen
(74) *Attorney, Agent, or Firm*—Pillsbury Winthrop Shaw Pittman LLP

(57) ABSTRACT

An optical arrangement comprising first and second guided structures for providing first and second beams of electromagnetic energy and a node for coherently combining said first and second beams in free space, that is, with an unguided structure. In the illustrative embodiment, the first and second structures are first and second fiber oscillators. The first and second fiber oscillators may be of unequal lengths. The node may be implemented with a polarizing beam splitter or a semi-reflective surface. Beam shaping optics are included in the node to collimate the first and second beams and provide a flat profile mode thereof. The outputs of plural first and second fiber oscillators are combined via plural nodes to provide a single high energy output beam. Amplifying elements may be disposed between nodes. The plural nodes may be disposed in a single integrated structure along with an outcoupler mirror to coherently phase lock the outputs of the plural oscillators.

51 Claims, 6 Drawing Sheets

OTHER PUBLICATIONS

Lyndin, N. M. et al.: "Laser System Composed of Several Active Elements Connected By Single-Mode Couplers", Quantum Electronics, Turpion Ltd., London, GB, vol. 24, No. 12, Dec. 1, 1994, pp. 1058-1061, XP000501779, ISSN: 1063-7818, *Abstract*, Figs. 1, 2, 6*, p. 1059, C. 1.

Lyndin, N. M. et al: "Coherent Coupling of Two Nd3+-Doped Single-Mode Waveguide Lasers Using Y-Junction", Proceedings of the SPIE, SPIE, Bellingham, VA, US, vol. 2212, Apr. 1994, pp. 564-570, XP002971033, ISSN: 0277-786X, *Abstract*, p. 565, Figs. 1, 2.

Simpson, T.B. et al: "Coherent Intracavity Coupling of Fiber Lasers" LEOS 2001; 14th Annual Meeting of the IEEE Lasers & Electro-Optics Society, San Diego, CA, No. 11-15, 2001, Annual Meeting of the IEEE Lasers and Electro-Optics Society, New York, NY: IEEE, US, vol. 1 of 2, Nov. 12, 2001, pp. 62-63 XP010566322, ISBN: 0-7803-7105-4.

Sabourdy, D. et al: "Coherent Combining of <E1>Q</E1>-Switched Fibre Lasers", Electronics Letters, IEE Stevenage, GB, vol. 40, No. 20, Sep. 30, 2004, pp. 1254-1255, XP006022707, ISSN:0013-5194.

* cited by examiner

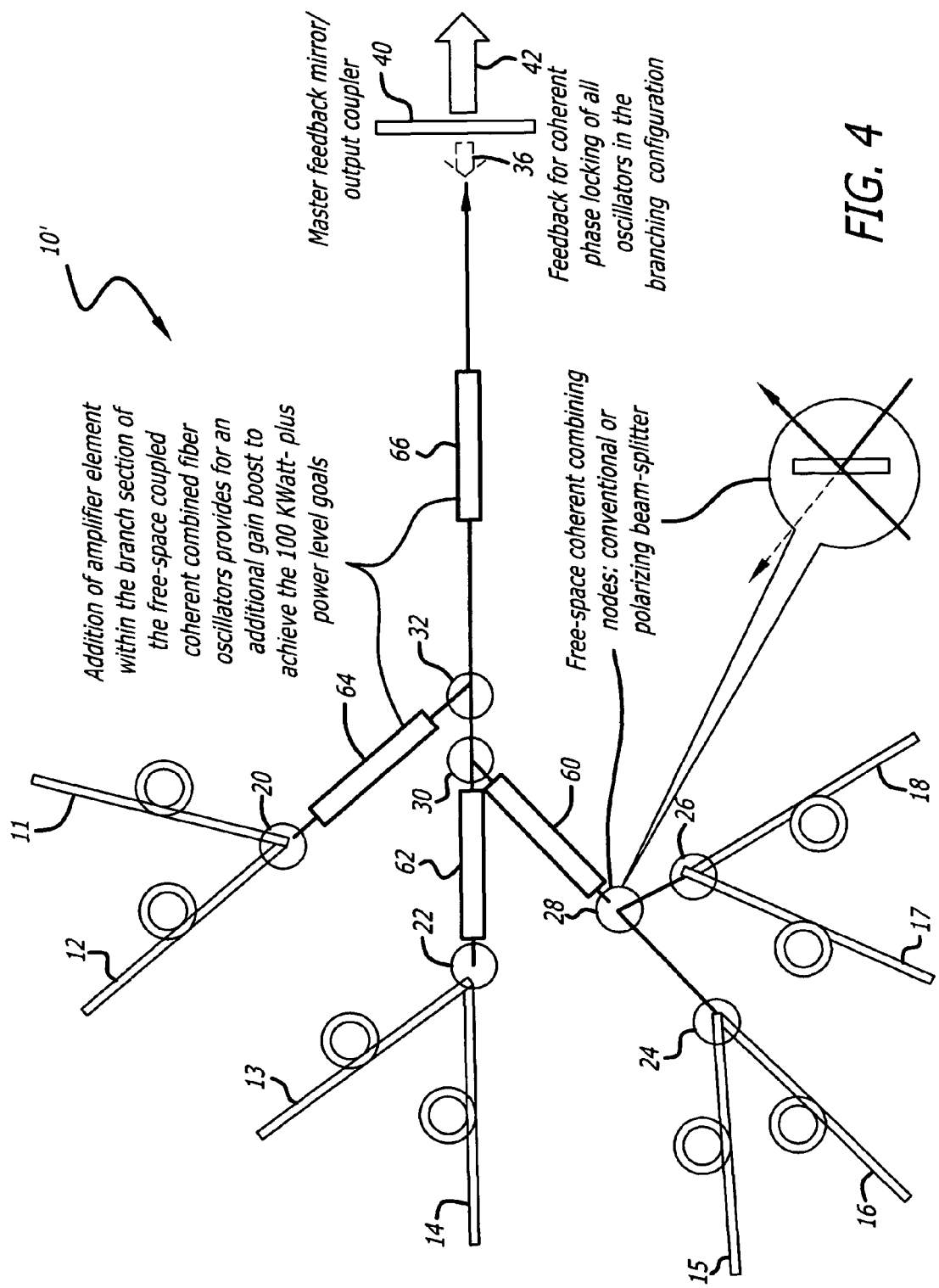

SELF-COHERENT COMBINING TECHNIQUE FOR HIGH POWER LASER IMPLEMENTATION AND METHOD

BACKGROUND OF THE INVENTION

1. Field of the Invention

The present invention relates to lasers. More specifically, the present invention relates to high energy lasers.

2. Description of the Related Art

High energy lasers are currently being evaluated for military and industrial applications. For these applications, fiber lasers have been shown considerable promise. These lasers are somewhat simple in design and have achieved relatively high power levels in the kilowatt range. A laser includes a laser amplifier mounted within a laser resonator. The resonator provides the feedback necessary to build oscillation within the laser. The bulk laser active medium of the laser amplifier may be in the shape of a slab, rod or disk. In a fiber laser, the active medium is an optical fiber doped with active ions and serves as the active medium for the laser. When pumped, the medium provides amplification. The provision of reflective gratings at the ends of the active medium provides a resonator.

The active medium in conventional fiber lasers is somewhat small, i.e., typically on the order of 10 microns which limits power scalability. This is due to the requirement of a small diameter to sustain a diffraction limited mode of operation within the laser. While efforts have been made to increase the core diameter of fiber lasers, to date, these efforts have not been sufficiently successful to raise the power limitations of fiber lasers to the levels needed for current and future applications.

For example, high energy solid-state lasers (based on Yb and Nd solid-state materials operating near 1 micron wavelengths) are gaining ground in the development toward achieving weapons grade status. One promising approach is based on the Yb:glass fiber lasers: Unfortunately, the highest power levels achieved to date are close to the damage threshold of the single mode fibers employed in these systems.

This has lead to attempts to coherently combine the outputs of multiple oscillators to achieve higher output power levels including the use of a Talbot effect and active modulation feedback loops. Although phase locking of multiple core fiber (MCF) lasers has been demonstrated, these systems rely on the Talbot effect (based on periodical structures) to phase lock. This phase locking technique is limited as it requires extremely precise equalization of the lengths of the individual cores and the positioning of the cores in precisely periodical structure and is also dependent on the individual power output in each core.

Further, there is a limit with respect to the number of elements that can be locked in this way because of multiplexing issues in the common cladding. That is, to tens of elements in a MCF type configuration, the Talbot effect would suffice. However, to extend the scaling to multi-kilowatt powers would require separate fiber laser oscillators. In that case, the Talbot effect by itself would not possess the required robustness to perform an effective phase locking.

An alternative approach previously explored involves the use of an active feedback loop for digital wavefront measurement and wavefront control. In this case, individual fiber amplifiers are used instead of individual fiber lasers. The output of a single oscillator is split and launched into individual fiber channels. At the output, the entire wavefront of the fiber amplifier array is measured and used to control a phase control element. However, this active method is limited to a few oscillators and quickly becomes too complex to implement for larger numbers of oscillators (i.e., greater than 10).

Thus, there is a need in the art for an improved system or method for coherently combining the outputs of multiple individual fiber lasers.

SUMMARY OF THE INVENTION

The need in the art is addressed by the system and method of the present invention. Generally, the inventive system includes first and second guided structures for providing first and second beams of electromagnetic energy and a node for coherently combining said first and second beams.

In the illustrative embodiment, the first and second structures are first and second fiber oscillators. Contrary to conventional teachings, the first and second fiber oscillators are preferably of unequal lengths. The node may be implemented with a polarizing beam splitter or a semi-reflective surface. In the best mode, beam shaping optics are included in the node to collimate the first and second beams and provide a flat profile mode thereof.

In practice, the outputs of plural first and second fiber oscillators are combined via plural nodes to provide a single high-energy output beam. Amplifying elements may be disposed between nodes. The plural nodes may be disposed in a single integrated structure along with an outcoupler mirror to coherently phase lock the outputs of the plural oscillators.

BRIEF DESCRIPTION OF THE DRAWINGS

FIG. 4 is a schematic illustrating an alternative embodiment in which amplifier elements are disposed between the nodes to provide additional amplification in accordance with the present teachings to further power boost performance.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

High energy solid-state lasers (based on Yb and Nd solid-state materials operating near 1 micron wavelength) are gaining ground in the development towards weapons-grade status. One promising approach is based on the Yb:glass fiber lasers. Several hundred watts operation from single mode Yb:glass fiber lasers has been achieved. (See Southampton Photonics press release, Aug. 27, 2003.)

This power level, however, is close to the damage threshold of single mode fibers (i.e., fibers with large mode area core). Hence, in order to scale this power to tens of kilowatts to hundreds of kilowatts requires a technique to coherently combine multiple fibers. Thus, there is a need for a robust passive coherent combining technique capable of phase locking individual oscillators in a passive manner.

The need in the art is addressed coherent combining technique of the present invention. The inventive system and technique disclosed herein provides for a robust phase locking of fiber oscillators in free-space. The branching self-phase locking approach of the present invention is illustrated in FIG. 1.

Figure 1:
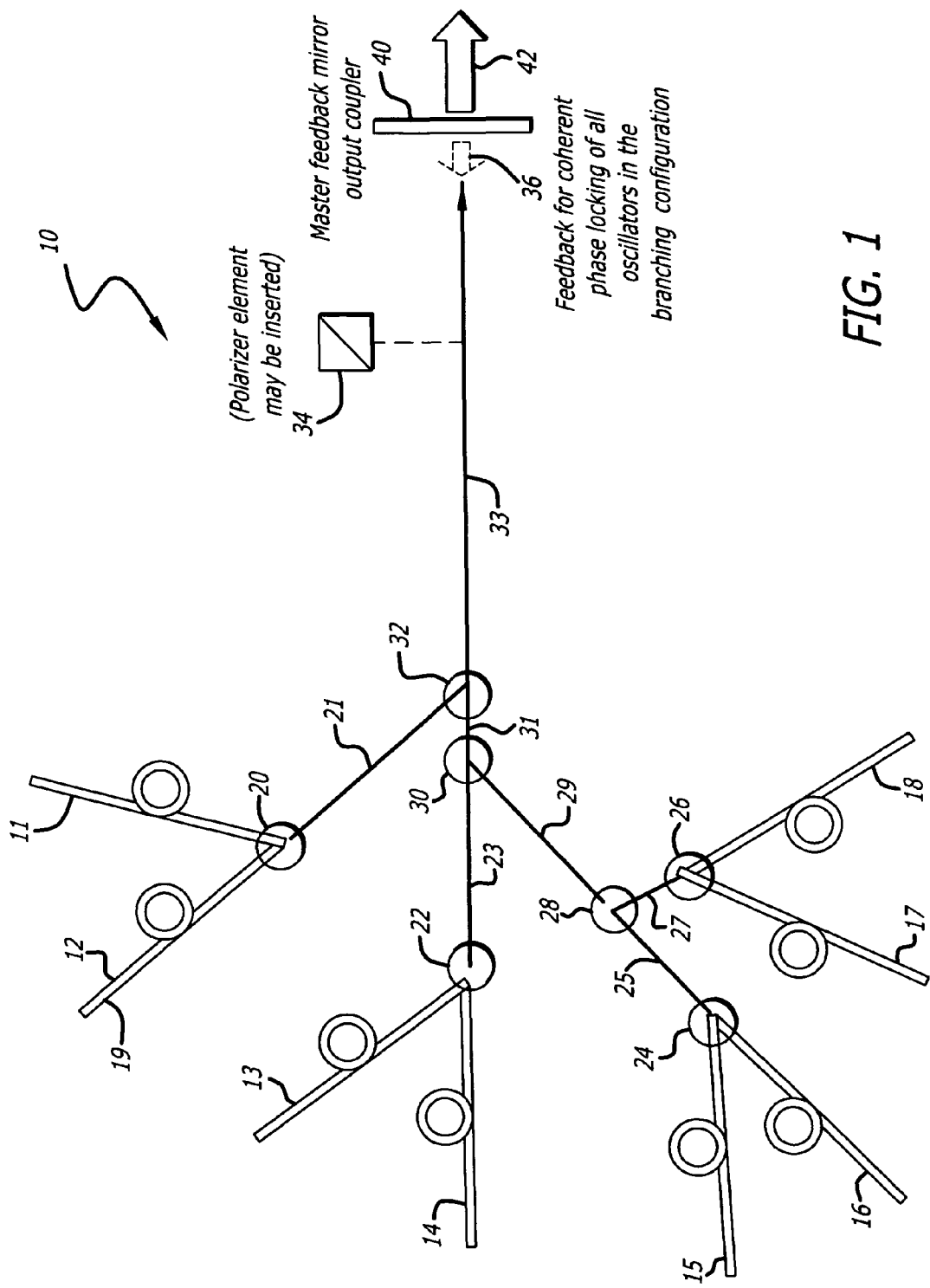
FIG. 1 is an optical schematic of the system for self-coherent phase locking of fiber oscillators in accordance with an illustrative embodiment of the present teachings.

FIG. 1 is an optical schematic of the system for self-coherent phase locking of fiber oscillators in accordance with an illustrative embodiment of the present teachings. As illustrated in FIG. 1, a laser 10 implemented in accordance with the present teachings includes a network of plural fiber oscillators 11-18 interconnected by a plurality of free-space combining nodes 20-26 (even numbers only). For N oscillators, N−1 free-space coherent combining nodes will be needed. As is well-known in the art, the fiber oscillators are elongate guided structures with a grating or high reflectivity mirror 19 at one end thereof. In the best mode, the individual fiber lasers will operate at their maximum allowable power level (given the large mode area single mode core size, SBS thresholds, etc.).

The free-space combining nodes are may be implemented with either conventional beam splitters utilizing the Mach-Zehnder interferometer-based mode selection or polarizing beam splitters that phase lock input beams via a polarization feedback/combining approach. In this context, the term 'free-space' means that the beams are combined in an unguided structure. There is no practical power limitation associated with "free-space" combining.

In the case of a conventional beam splitter, the Mach-Zehnder interferometric effect will provide for phased longitudinal modal locking of the individual branch elements. Thus, the first beam from the first oscillator 11 is combined with the second beam from the second oscillator by the first free-space node 20 and output as a third beam 21. Likewise, the beams from the third and fourth oscillators 13 and 14 are combined into a fourth beam 23. Similarly, fifth and sixth beams 25 and 27 result from a combination of the beams output by the fifth and sixth and seventh and eighth oscillators 15 and 16 and 17 and 18.

The combined beams are combined, in turn, by a set of secondary free-space combining nodes 28, 30 and 32. The resultant beam, output by the final node 32 is directed to a master feedback output coupler mirror 40 via an optional polarizer 34. The mirror 40 feeds a portion of the beam back to the oscillators via the combining nodes to achieve a coherent phase locking of the oscillators in the network. The result is a multi-branch resonator with each fiber being an active medium therein. Significantly, the fibers need not be of equal lengths. Indeed, in the best mode, the fibers are of unequal lengths.

Figure 2A:
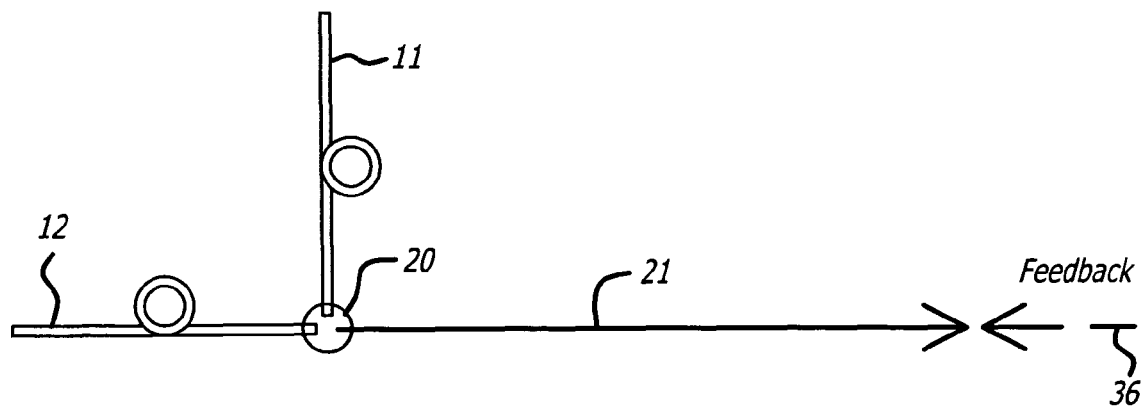
FIG. 2a is a partial view of the optical schematic of FIG. 1.

FIG. 2a is a partial view of the optical schematic of FIG. 1. In FIG. 2a, the first and second oscillators 11 and 12 are shown along with the first node 20.

Figure 2B:
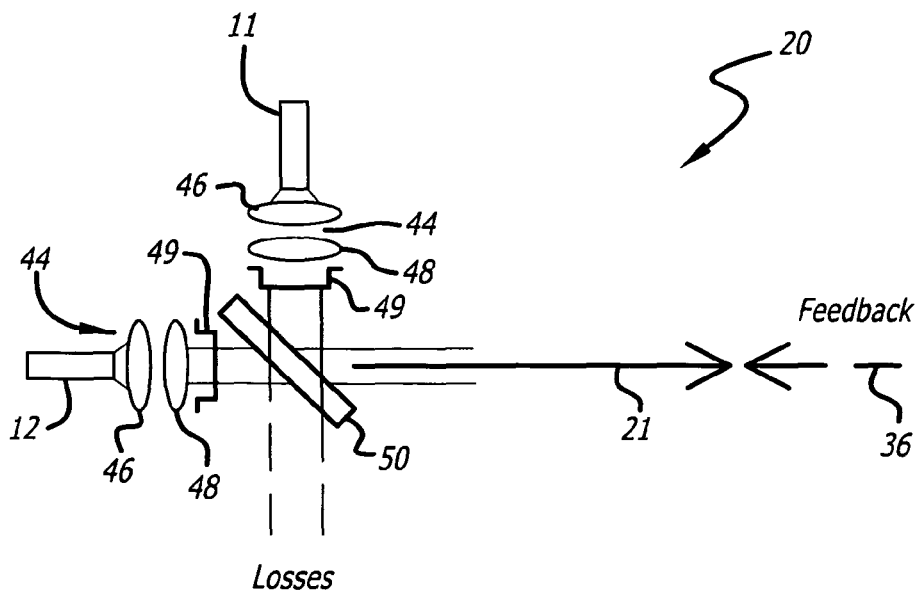
FIG. 2b is a magnified view showing an illustrative implementation of a single free-space node in accordance with the teachings of the present invention.

FIG. 2b is a magnified view showing an illustrative implementation of a single free-space node in accordance with the teachings of the present invention. In the illustrative embodiment, the nodes are identical. In FIG. 2b, the first node 20 is shown as having beam shaping optics 44 including first and second lenses 46 and 48 in optical alignment with the output aperture of a respective fiber oscillator 11 or 12. As illustrated at 49 in FIG. 2b, the beam shaping optics 44 ensure that the beam output by the fiber oscillator has an approximately uniform cross-sectional intensity profile and a flat phase front. However, Gaussian-like zero-order fiber modes may suffice as well and need not be of uniform intensity.

The shaped profiles of the first and second beams output by the first and second oscillators 11 and 12, respectively, are applied to a conventional beam splitter/combiner 50. Those skilled in the art will appreciate that constructive interference ensures that only phase-locked modes will be see amplification due to feedback.

Figure 2C:
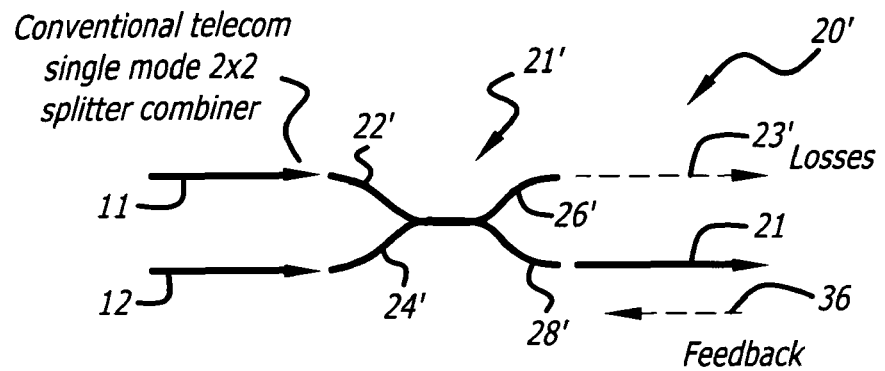
FIG. 2c is a magnified view showing an alternative implementation of a single node in accordance with the teachings of the present invention.

FIG. 2c is a magnified view showing an alternative implementation of a single node 20' in accordance with the teachings of the present invention. In FIG. 2c, the beams or wavefront output by the oscillators are combined via a conventional 2×2 telecom single mode splitter/combiner 21' having first and second input legs 22' and 24' and output legs 26' and 28'. Utilizing the self-aligning/adjusting wavelength (frequency) from feedback through a monolithic all-fiber based node is robust as it is inherently self-aligned. However, the implementation of the free-space imaging optics approach (FIG. 2b) for higher power scaling can be implemented on a monolithic optical bench that maintains the critical alignment of the interferometer. In both cases the self-adjusting of the wavelength (frequency) causes the coherent phase locking of the two beams.

Figure 3A:
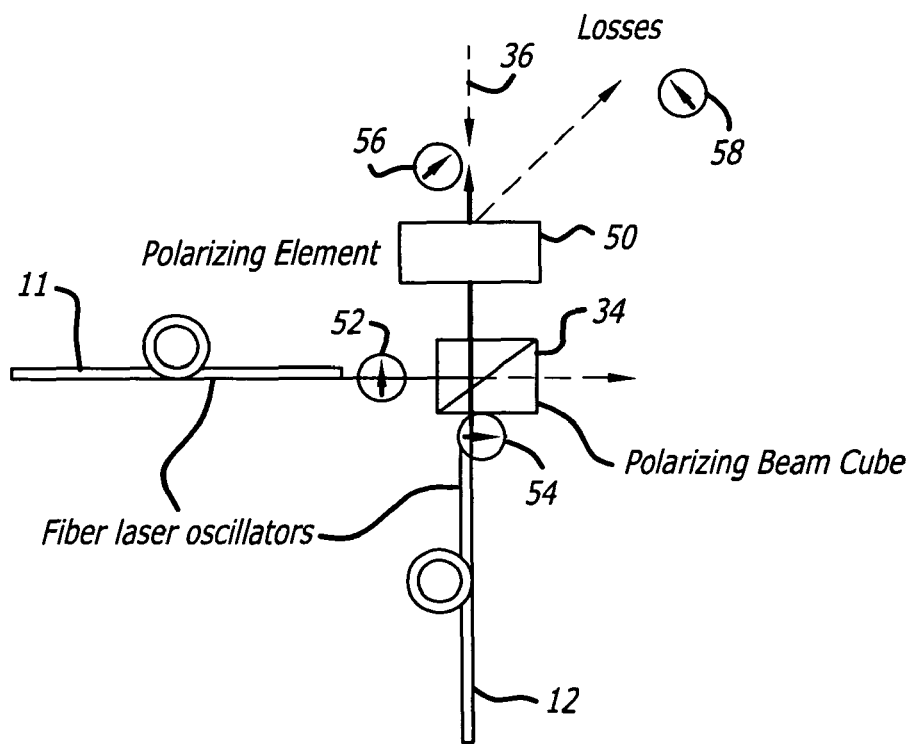
FIG. 3a shows another alternative implementation of a node in accordance with the present teachings where polarization combining is utilized.

FIG. 3a shows another alternative implementation of a node in accordance with the present teachings. In this embodiment, polarization is used to combine the input beams. This is similar to the Mach-Zehnder approach described above. There and here self-wavelength (frequency) adjustment is the phase locking mechanism. As is known in the art, in the embodiment of FIG. 3a, light of a first polarization 52 is reflected by the beam splitter 52 while light in the second beam of an orthogonal polarization is transmitted by the beam splitter 34. A combined polarized beam is then output by the beam splitter 34. The polarized beam is then combined with other beams (not shown) via a second polarizer 50. In FIG. 3a, two linear polarization states—mutually orthogonal—will couple. The polarizing element 50 will facilitate the coherent combining of the two polarizations to match the next polarizing beam combiner low loss polarization state. Feedback from the master output coupler provides preferential polarization state feedback for lowest loss. In this case the constructive addition/feedback is provided by preferential polarization state selection which is similar to the interferometer constructive interference approach discussed above.

Proper alignment of the nodes, the output mirror and the oscillators may be maintained by mounting some or all of the components in a single integrated structure such as glass. There are two approaches that achieve this.

Figure 3B:
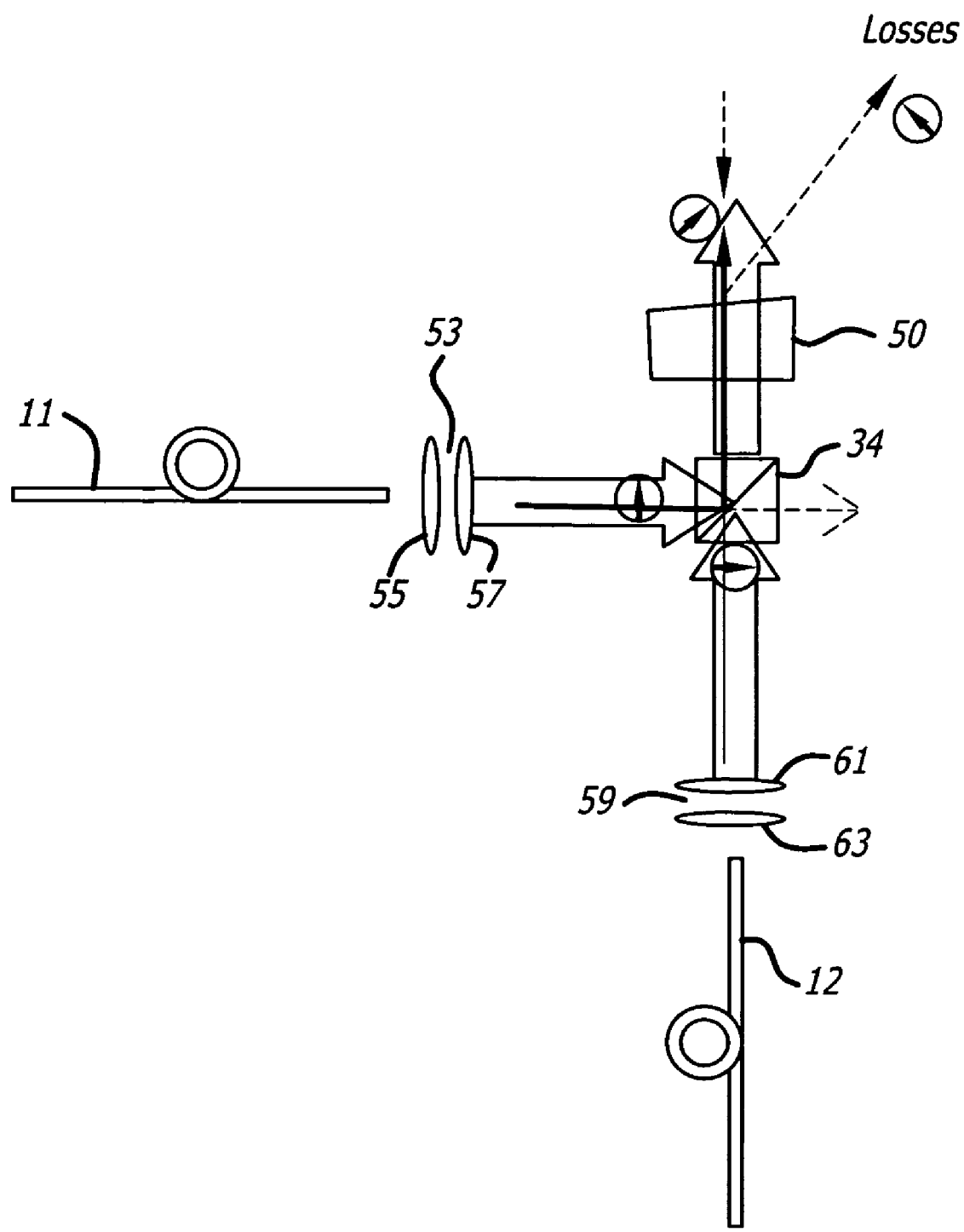
FIG. 3b shows a free-space imaging optics implementation of the polarization-based combining node in accordance with the present teachings.

FIG. 3b shows a free-space imaging optics implementation of the polarization—based combining node in accordance with the present teachings. FIG. 3b shows the free-space imaging optics approach where again a monolithic optical bench is utilized in order to ensure the robust alignment maintenance of the polarization combiner node. In this embodiment, first and second sets of collimating free-space optical elements 53 and 59 are inserted between the first and second fiber laser oscillators 11 and 12, respectively, and the polarizing beam cube 34. Each set of optical elements includes first and second lenses 55 and 57 and 61 and 63.

An alternate approach utilizes non-imaging optics/light guides that can be monolithically integrated with the polarizing element and the outputs of the oscillators or amplifier arms. This is shown in FIG. 3c.

Figure 3C:
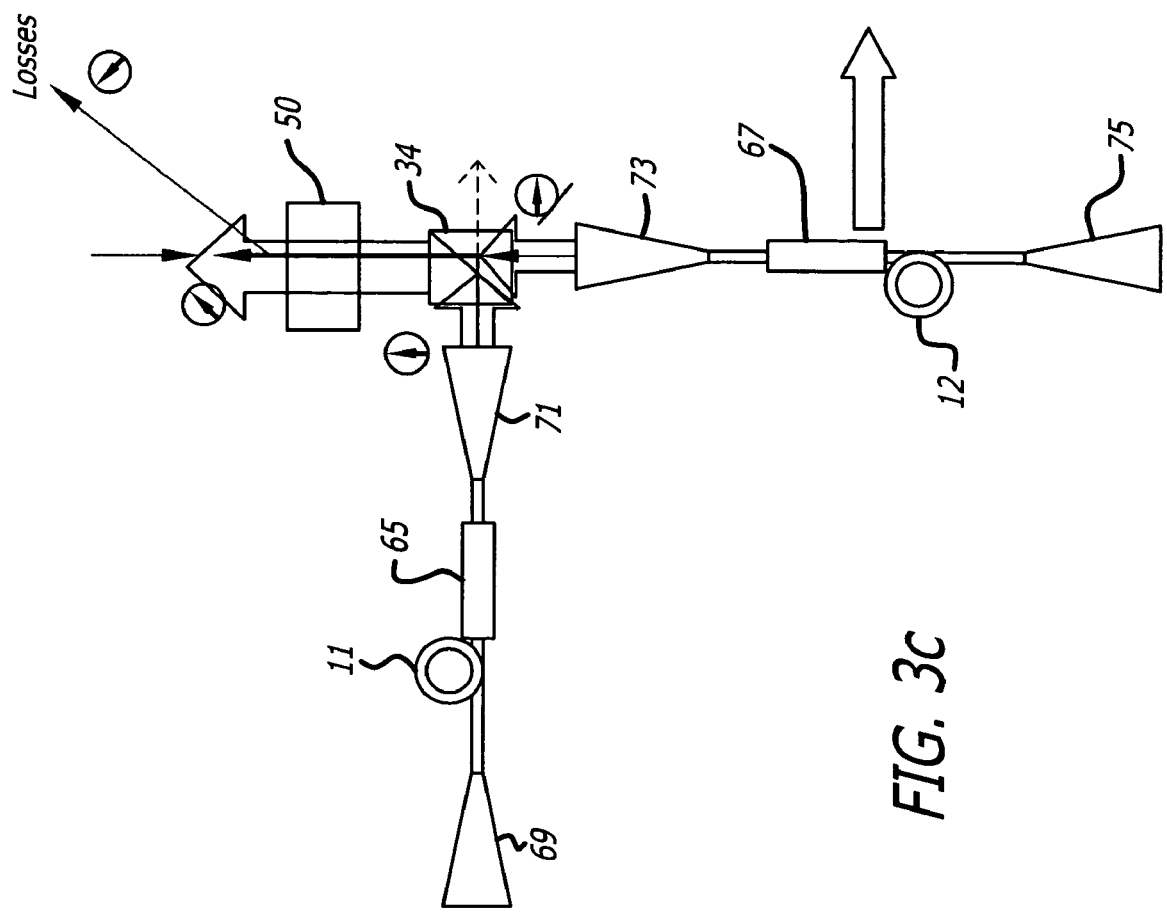
FIG. 3c shows a quasi-monolithic non-imaging light guide approach for achieving the polarization based coherent combining node in accordance with the present teachings.

FIG. 3c shows a quasi-monolithic non-imaging light guide approach for achieving the polarization based coherent combining node in accordance with the present teachings. Here, the fiber oscillators 11 and 12 are supplemented with in-line amplifiers 65 and 67, respectively. In addition, each oscillator 11 and 12 has an integral non-imaging optical light guide 69 and 71 and 73 and 75, respectively, for collimation and profile flattening. The light guides may be implemented with glass with low numerical aperture cladding. This light guide approach provides high power scaling yet is capable of quasi-monolithic/inherently self-aligned node implementation, especially further in the hierarchy/chain towards the final coherently combined output point.

Returning to FIG. 1, the individual fiber oscillators will have random phases and multiple longitudinal modes. Because of the feedback from the master mirror/output coupler, the out-of-phase components will exhibit a much higher loss and will, therefore, be suppressed. Only in-phase modes will be amplified through the coupled oscillator chain.

In order to achieve phase—coherent—locking of individual fiber oscillators, two conditions need to be satisfied:

1) the oscillators must operate at the same frequency (or frequencies) $\omega_j = \omega$ within the gain bandwidth and 2) the phases of the individual oscillators must match: $\phi_j = \phi$.

In the best mode, the lengths of the fibers are chosen to provide longitudinal mode overlap between the beams traveling along the fibers to ensure that different fibers can operate at the same wavelength(s), providing maximum beam combining efficiency via the beam splitter element (phase-locker). The fiber laser oscillator resonators differ in length sufficiently to ensure that free spectral range is exceeded so that longitudinal mode overlap occurs between individual fiber oscillator branch elements.

In a long cavity length oscillator of length L (here L is the optical length, where refractive index is taken into account; optical length is product of physical length and material refractive index (n), the longitudinal mode spacing ($\Delta_v = v_{q+1} - v_q$, where $v_q$ is the frequency of a "q" mode) defined by the resonator cavity is:

$$\Delta v = \frac{c}{2L}, \quad [1]$$

or in terms of wavelength ($\Delta\lambda = \lambda_{q+1} - \lambda_q$, $\lambda_q$ is the wavelength of a "q" mode):

$$\Delta\lambda = \frac{\lambda^2}{2L}, \quad [2]$$

where 'c' is the speed of light, and $\lambda$ is the center (peak) laser wavelength. Hence, for a resonator 10 meters in length, the longitudinal mode spacing (for a 1645 nm laser peak wavelength) is approximately 0.0014 Angstroms.

The linewidth of a laser active medium gain spectrum ($\delta v$ or $\delta \lambda$ in frequency and wavelength domains respectively) determines a number (N) of longitudinal modes at which the laser is capable of oscillating:

$$N = \frac{\delta v}{\Delta v} = \frac{\delta \lambda}{\Delta \lambda} \quad [3]$$

The longer the oscillator cavity 'L' the larger number of longitudinal modes can participate in the laser generation process. The linewidth of a typical fiber laser is ~10 Angstroms. Thus, the gain medium can support approximately N≈6000 modes for exemplary 10 meters long fiber laser resonator.

As the lengths of the fibers vary, so does the mode spacing $\Delta v_j$ and the number of longitudinal modes within the gain linewidth $N_j$ ($\Delta v_j$ and $N_j$ are the mode spacing and the number of longitudinal modes corresponding to a "j" fiber laser). If the lengths of fibers differ substantially, so that the difference in number of modes $\Delta N = |N_j - N_k|$ for any two (numerated as "j" and "k") different fibers is greater than two, $\Delta N > 2$, then the longitudinal mode distributions corresponding to different fibers will provide such overlap that there will be one or several particular modes closely matched in wavelength(s): $\lambda_{jq} \cong \lambda_{km}$, where $\lambda_{jq}$ is "q" mode of a "j" fiber and $\lambda_{km}$ is "m" mode of a "k" fiber. The condition $\Delta N > 2$ leads to the requirement on the difference $\Delta L$ in lengths of any two fibers in the fiber bundle: $\Delta L = |L_j - L_k|$, where $L_j$, $L_k$ are lengths of fiber lasers "j" and "k":

$$\Delta N = \left| \frac{\delta v}{\Delta v_j} - \frac{\delta v}{\Delta v_k} \right| = \left| \frac{\delta \lambda}{\Delta \lambda_j} - \frac{\delta \lambda}{\Delta \lambda_k} \right| > 2 \text{ leads to } \Delta L > \frac{c}{\delta v} = \frac{\lambda^2}{\delta \lambda} \quad [4]$$

A sufficiently large difference in lengths of fibers provides the possibility for all fiber lasers in a bundle to operate at the same common wavelength(s) randomly picked up within the gain linewidth. The operation at a common wavelength(s) is forced by a coherent phasing mechanism due to the use of a common resonator with multiple branches. Longer fibers and larger gain linewidth make it easier for such longitudinal mode overlap conditions take place. For example, in the case of fiber lasers with about 10 Angstroms linewidth, the difference in optical lengths should be more than ~1.5 mm. This usually takes place naturally with fibers of several meters in length, unless one makes them precisely equal in length intentionally.

Therefore, either ensuring precisely equal lengths of the fiber oscillators resonator lengths or deliberately making these varying lengths with length differences exceeding 1.5 mm, ensures that all fiber oscillators will be capable of longitudinal mode overlap and therefore capable of being phase locked via the beam splitter/combiner.

Depending on gain linewidth, fibers lengths and lengths differences, longitudinal modes overlap may give not just one but multiple closely matched wavelengths. In this case additional spectral etalon can be used to select the operation only at one particular common wavelength if needed.

The possibility for the fiber lasers to operate at a common wavelength(s) due to longitudinal mode overlap, is required but not enough for coherent phasing. There should be a phase matching mechanism that forces the phases ($\phi_j$) of individual laser beams traveling in different fibers to be matched (or equal with regards to any integer number of $2\pi$ (or $\lambda$ in distance) phase differences) in a common plane at each branch node for any two fibers, as well as at the master outcoupler for all the fibers. Thus, the overall combined beam has a nearly flat phase in the plane prior to proceeding to the next free-space combining node. There is discussed more fully below.

The phase difference, $|\Delta\phi_{jk}|=|\phi_j-\phi_k|$, between phases $\phi_j$ and $\phi_k$ corresponding to any two "j" and "k" individual fiber laser beams traveling resonator round trip distances $L_j$ and $L_k$ respectively can be written as $$|\Delta\varphi_{jk}| = \frac{2\pi}{\lambda} 2|L_j - L_k| \quad [5]$$

where $\lambda$ is a common operating wavelength. The difference in round trip distances, $2|\Delta L_{jk}|=2|L_j-L_k|$, is related mainly to the difference in fibers lengths and usually is very large compared to the wavelength $\lambda$. The phase difference explicitly as an integer number of full $2\pi$ cycles may be written as:

$$|\Delta\varphi_{jk}| = \frac{2\pi}{\lambda} 2|\Delta L_{jk}| = 2\pi[M_{jk} + f_{jk}] \quad [6]$$

where $M_{jk}$ is a big integer number, and $f_{jk}$ is a number less than one. Phase matching occurs when all $f_{jk}$ are equal to some value, $f_{jk}=f$, common for all fiber lasers in the bundle, regardless how different and how large the integer numbers $M_{jk}$ are. Without losing generality one can say that the exact phase matching condition takes place when $f=0$.

Exact coherent phasing occurs when there is a common wavelength/frequency, $\lambda_{jq}=\lambda$ or $\nu_{jq}=\nu$, and a phase match, $f_{jk}=0$, of the two combining branch oscillator elements. There will typically be some initial non-equalities in these conditions, which in practice will be self-adjusted and accommodated during laser operation. Multiple nonlinear mechanisms and processes in active lasing medium and laser cavity, specifically those that responsible for changing refractive index (n) and length, may help in self-adjusting and facilitating the wavelength and phase matching conditions.

Variations of refractive index, $\delta n$, and optical length, $\delta L$, will result in variations of frequency, $\delta\nu$, and phase, $\delta\phi$, as follows:

$$\delta\varphi = \left(\frac{2\pi}{\lambda} 2L\right)\left(\frac{\delta L}{L} + \frac{\delta n}{n}\right) \quad [7]$$

$$\delta\nu = -\nu\left(\frac{\delta L}{L} + \frac{\delta n}{n}\right) \quad [8]$$

To calculate phase variation relative to $2\pi$ cycle and frequency change relative to longitudinal modes spacing respectively:

$$\frac{\delta\varphi}{2\pi} = -\frac{\delta\nu}{\Delta\nu} = \left(\frac{2L}{\lambda}\right)\left(\frac{\delta L}{L} + \frac{\delta n}{n}\right) \quad [9]$$

Even small changes in $\delta n$ and $\delta L$ can be sufficient for large enough magnitude of $\delta\phi$, $\delta\nu$ variations: $\delta\phi/2\pi$, $\delta\nu/\Delta\nu\sim1$. In the case where, $\lambda$ is ~1600 nm and L=10 m, we have $2L/\lambda\sim10^6$, meaning that $\delta L/L\sim\delta n/n\sim5\times10^{-8}$ is sufficient. Multiple nonlinear mechanisms may contribute at such a small required level of changes of $\delta n$ and $\delta L$.

Phase-locking techniques disclosed herein for combining many individual oscillators can be applied to any fiber laser system including Yb:glass fiber lasers and Er:glass fiber lasers and amplifiers.

As is known in the art, laser light traveling along the fibers may have variations in intensities, amplitudes, and phases. The two single transverse mode beams impinging on the beam splitter will have different phases. However, only the in-phase components that create constructive interference will see substantial gain due to the feedback from the master output coupler element because there will be little or no losses for the commonly operating mode. Consequently, the two branch elements (fiber oscillators) will phase lock.

FIG. 4 is a schematic illustrating an alternative embodiment in which amplifier elements 60, 62 and 64 are disposed between the nodes to provide additional amplification in accordance with the present teachings to further power boost performance. As will be appreciated by those skilled in the art, the amplifiers 60, 62 and 64 may be implemented within the branches of the coherently combined laser system/assembly.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. An arrangement comprising:
   first means for providing a first beam of electromagnetic energy, said first means including means for guiding said first beam;
   second means for providing a second beam of electromagnetic energy, said second means including means for guiding said second beam; and
   third means for coherently combining said first and second beams to produce a third beam, said third means including a polarizing beamsplitter,
   wherein said first means for guiding said first beam and said second means for guiding said second beam are of unequal lengths.

2. The arrangement of claim 1 wherein said means for guiding said first beam includes a first fiber oscillator.

3. The arrangement of claim 2 wherein said means for guiding said second beam includes a second fiber oscillator.

4. The arrangement of claim 1 wherein said third means includes means for combining said first and second beams with an unguided structure.

5. Then arrangement of claim 1 wherein said third means includes means for combining said first and second beams with a guided structure.

6. The arrangement of claim 1 wherein said third means includes a semi-reflective surface.

7. The arrangement of claim 1 wherein said third means is disposed in an integrated structure.

8. The arrangement of claim 1 further including means for coherent phase locking of said first and said second beams.

9. The arrangement of claim 8 wherein said means for coherent phase locking includes a mirror.

10. The invention arrangement of claim 1 wherein said third means includes beam shaping optics.

11. The arrangement of claim 10 wherein said beam shaping optics includes means for collimating said first beam.

12. The arrangement of claim 11 wherein said beam shaping optics includes means for providing a flat phase profile mode with respect to said first beam.

13. The arrangement of claim 11 wherein said beam shaping optics includes means for collimating said second beam.

14. The arrangement of claim 13 wherein said beam shaping optics includes means for providing a flat phase profile mode with respect to said second beam.

15. The arrangement of claim 1 wherein said third means includes a splitter combiner.

16. The arrangement of claim 1 wherein said third means provides a first free space combining node.

17. The arrangement of claim 16 further including a second free space combining node in optical alignment with said first node.

18. The arrangement of claim 17 further including means for amplifying a beam directed from said first node to said second node.

19. A high-energy laser comprising:
a first fiber oscillator for providing a first beam, said first fiber oscillator having a first length;
a second fiber oscillator for providing a second beam, said second fiber oscillator having a second length, said second length being different from said first length; and
a polarizing beamsplitter for coherently combining said first and said second beams to produce a third beam.

20. The high-energy laser of claim 19 wherein said unguided structure includes a semi-reflective surface.

21. The high-energy laser of claim 19 wherein said unguided structure is disposed in an integrated structure.

22. The high-energy laser of claim 19 further including a mirror.

23. The high-energy laser of claim 19 wherein said unguided structure includes beam splitting optics.

24. The high-energy laser of claim 23 wherein said beam shaping optics includes means for collimating said first beam.

25. The high-energy laser of claim 24 wherein said beam shaping optics includes means for providing a flat phase profile mode with respect to said first beam.

26. The high-energy laser of claim 24 wherein said beam shaping optics includes means for collimating said second beam.

27. The high-energy laser of claim 26 wherein said beam shaping optics includes means for providing a flat phase profile mode with respect to said second beam.

28. The high-energy laser of claim 19 wherein said unguided structure includes a splitter combiner.

29. The high-energy laser of claim 19 wherein said unguided structure includes a polarizer.

30. The high-energy laser of claim 19 wherein said unguided structure provides a first node.

31. The high-energy laser of claim 30 further including a second node in optical alignment with said first node.

32. The high-energy laser of claim 31 further including means for amplifying a beam directed from said first node to said second node.

33. A beam combining method, comprising:
providing a first beam of electromagnetic energy, including the step of guiding said first beam along a first predetermined length with a first guided structure;
providing a second beam of electromagnetic energy, including the step of guiding said second beam along a second predetermined length with a second guided structure, said second predetermined length being different from said first predetermined length; and
coherently combining said first and second beams with a polarizing beam splitter to produce a third beam.

34. An arrangement comprising:
first means for providing a first beam of electromagnetic energy, said first means including means for guiding said first beam along a first length;
second means for providing a second beam of electromagnetic energy, said second means including means for guiding said second beam along a second length;
third means arranged at a node for coherently combining said first and second beams with a polarizing beam splitter to produce a combined beam that propagates in a first direction; and
fourth means for coherently phase locking said first and second beams by feeding back said combined beam back toward said node in a direction opposite to the first direction.

35. The arrangement according to claims 34, wherein said second length is different from said first length.

36. The arrangement according to claims 34, wherein said means for coherent phase locking comprises a mirror.

37. A high-energy laser comprising:
a first fiber oscillator configured to provide a first beam;
a first polarizer configured to convert the first beam to a first polarization;
a second fiber oscillator for providing a second beam;
a second polarizer configured to convert the second beam to a second polarization, the second polarization being different that the first polarization;
a free-space coherent combining node configured to coherently combine said first and said second beams; and
a polarization element configured to couple the first and second polarizations of the first and second beams to provide a combined beam having a polarization determined in response to a polarization feedback of the laser output.

38. The high-energy laser according to claim 37, wherein said node comprises a beam splitter utilizing the Mach-Zehnder interferometer-based mode selection.

39. The high-energy laser according to claim 37, wherein said node comprises a polarizing beam splitter.

40. The high-energy laser according to claim 37, wherein the first fiber oscillator has a first length, and the second fiber oscillator has a second length, said second length being different from said first length.

41. The high-energy laser according to claim 37, wherein said node includes a semi-reflective surface.

42. The high-energy laser according to claim 37, wherein said node is disposed in an integrated structure.

43. The high-energy laser according to claim 37, wherein said node comprises beam shaping optics.

44. The high-energy laser according to claim 37, wherein said fiber oscillators comprise an integral non-imaging optical light guide configure to collimate and profile flatten said beams.

45. The high-energy laser according to claim 37, wherein said node comprises a polarizer.

46. The high-energy laser according to claim 37, further comprising a second node in optical alignment with the first node.

47. The high-energy laser according to claim 46, further comprising an amplifier provided between said first node and second node.

48. The high-energy laser according to claim 46, wherein the outputs of plural first and second fiber oscillators are combined via plural nodes to provide a single high-energy output beam.

49. The high-energy laser according to claim 37, further comprising a mirror.

50. The high-energy laser according to claim 49, wherein the mirror is a master output coupler.

51. The high-energy laser according to claim 50, wherein the feedback from the master output coupler provides polarization feedback for lowest loss.

* * * * *